April 21, 1931.  R. GENENGER  1,801,733
GLASS ROLLING MACHINE
Filed May 11, 1929
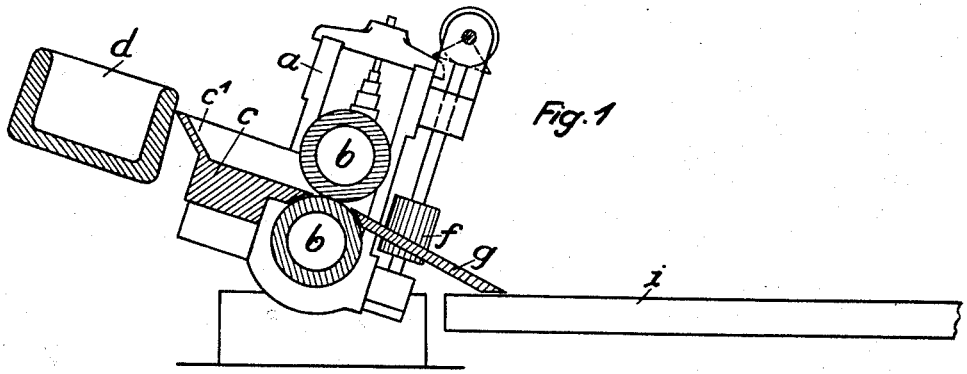
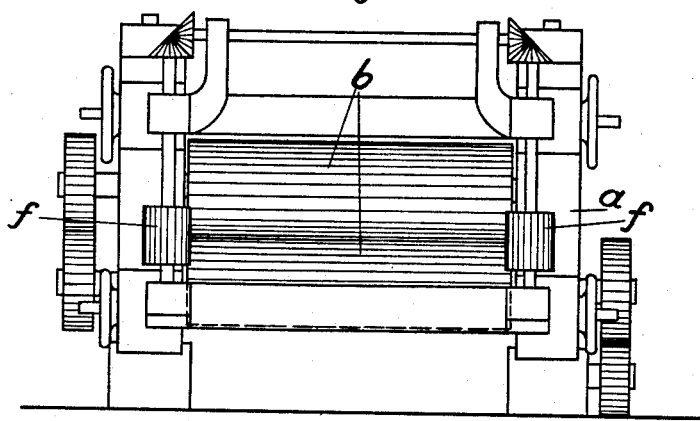 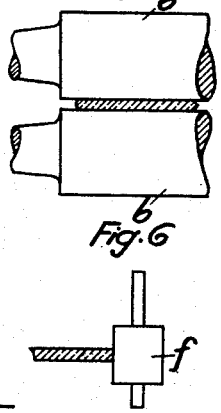
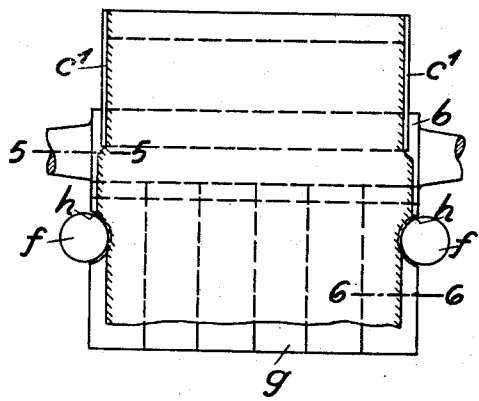 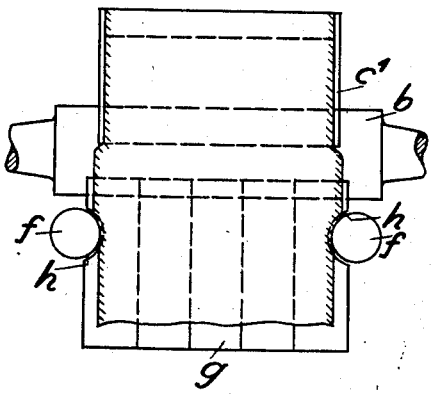
Inventor:
Richard Genenger Patented Apr. 21, 1931

1,801,733

UNITED STATES PATENT OFFICE

RICHARD GENENGER, OF AACHEN-FORST, GERMANY, ASSIGNOR, BY MESNE ASSIGNMENTS, TO THE AMERICAN BICHEROUX COMPANY, A CORPORATION OF DELAWARE

GLASS-ROLLING MACHINE

Application filed May 11, 1929, Serial No. 362,429, and in Germany May 18, 1928.

This invention relates to a machine for rolling glass, such as sheet glass, window glass or the like, in which the plastic glass plates as they emerge from between the forming rolls pass down an inclined chute to transporting tables or other transporting means by which they are conveyed to a lehr for being annealed.

It has been found that in the known glass rolling machines the edges of the glass plates are serrated and have flaws which, in the course of the subsequent annealing of the plates, often result in severe cracks by which the value of the product is decreased, waste caused and a more intensive and prolonged grinding and polishing made necessary.

The invention has for its object to provide an improved glass rolling machine by which the afore-said drawback is avoided. This object is attained by arranging in rear of the forming rolls at both sides of the machine substantially vertical rollers adapted to work upon the edges of the glass plates emerging from between the forming rolls. These vertical rollers straighten and smooth the edges of the glass plates and thereby prevent the formation of serrations and resultant cracks or even breakage of the glass.

An embodiment of a glass rolling machine constructed in accordance with the invention is illustrated, by way of example, in the accompanying drawings.

Fig. 1 is a cross-section of the machine. Fig. 2 is an elevation of the same. Fig. 3 is a diagrammatic plan view of the machine, the upper forming roll being omitted. Fig. 4 is a similar plan view with a receiver and chute of smaller width. Figs. 5 and 6 are sections on the lines 5—5 and 6—6, respectively, of Fig. 3, illustrating the contour of an edge of the glass plate before and after its treatment by the vertical rollers.

The machine shown comprises a tiltable frame $a$, a pair of cooperating plate forming rolls $b$ $b$, a receiver or teeming table $c$ on which the liquid glass mass, for instance the contents of a melting pot, is poured, and a chute $g$ on which the rolled plates glide down to a transporting table $i$ or other suitable transporting means.

Arranged as closely as possible behind the rolls $b$ $b$ on each side of the machine is a vertical roller $f$. The rollers $f$ $f$ are rotated in any suitable way. They are mounted in such a manner that the edges of the glass plates in passing down the chute $g$ come into contact with and are worked upon by the rollers $f$ $f$. The rollers $f$ $f$ are preferably carried by the frame $a$ so that, when this frame is tilted forwardly or rearwardly, they will take part in this tilting movement.

The width of the glass plates formed in the machine is more or less determined by the side walls $c^1$ of the receiver $c$, but in the actual forming operation between the rolls $b$ $b$ the plates become somewhat broader than the distance between the side walls $c^1$. The width of the plates should, however, not exceed the width of the chute $g$. The bodies of the vertical rollers $f$ $f$ lie partly above and partly below the chute $g$ at the sides thereof. As shown in Figs. 3 and 4, the chute is provided at its sides with recesses $h$ which extend below the edges of the glass plate. The rollers $f$ $f$ project into these recesses so as to engage and work upon the plate edges.

It is preferable to make the rollers $f$ $f$ adjustable both vertically and horizontally. An adjustment in vertical direction may become necessary when the angular position of the frame $a$ with relation to the horizontal plane is changed. The vertical rollers have to be adjusted in horiontal direction if it is intended to make glass plates of a width deviating from the width for which the machine was set. In the machine according to Fig. 4 there are, for example, made glass plates of a width smaller than in Fig. 3 and the distance between the rollers $f$ $f$ must therefore be reduced accordingly. In order to render this horizontal adjustment of the rollers $f$ $f$ possible, the chute is composed of a plurality of individually removable pieces lying beside one another. By taking out one or more of these pieces and pushing the remaining pieces together, the width of the chute is reduced, so that the rollers $f$ $f$ can be set at a correspondingly smaller distance. As a matter of course, the recesses $h$ are in the left and right end pieces which are always left in the chute.

Having thus described my invention, what I claim as new and desire to secure by Letters-Patent, is:—

1. In a machine for rolling plate glass, a pair of cooperative forming rolls, an inclined chute for receiving the plates emerging from between the forming rolls, and a rotatable vertical roller located at each side of the chute for smoothing the edges of the glass plate while passing over the chute.

2. In a machine for rolling plate glass, a pair of cooperative forming rolls, an inclined chute for receiving the plates emerging from between the forming rolls, recesses in the side edges of the chute, and rotatable vertical rollers arranged at both sides of the chute so as to project into the said recesses for engaging and smoothing the glass plates while passing down over the chute.

3. In a machine for rolling plate glass, a pair of cooperative forming rolls, an inclined glass plate receiving chute on the exit side of the rolling mechanism, which chute consists of a plurality of individually removable pieces arranged beside one another, recesses in the outer side edges of the lateral end pieces of the chute, and rotatable rollers for smothing the glass edges located at both sides of the chute and projecting into the said recesses.

4. In a sheet glass forming machine, the combination of forming means and rotatable vertical rollers located on both sides of the forming means adjacent thereto, said rollers being in intimate contact with the edges of the sheet glass to smooth the edges of said sheet glass.

5. The method of forming sheet glass which comprises rolling a sheet of glass to the desired thickness and thereafter compressing the lateral edges of the sheet to smooth out irregularities therein.

6. The method of forming sheet glass which comprises rolling a sheet of glass to the desired thickness and immediately thereafter, while the glass is still hot, rolling the vertical edges of the sheet to reduce the serrations therein.

In testimony whereof I have signed my name to this specification.

RICHARD GENENGER.